US011623543B2

(12) United States Patent
Kirchhoffer

(10) Patent No.: US 11,623,543 B2
(45) Date of Patent: Apr. 11, 2023

(54) METHOD FOR OPERATING AN ON-BOARD ELECTRICAL NETWORK OF A MOTOR VEHICLE

(71) Applicant: Ford Global Technologies, LLC, Dearborn, MI (US)

(72) Inventor: Johann Kirchhoffer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 17/024,218

(22) Filed: Sep. 17, 2020

(65) Prior Publication Data

US 2021/0078443 A1  Mar. 18, 2021

(51) Int. Cl.
| | |
|---|---|
| B60L 58/20 | (2019.01) |
| F16H 61/02 | (2006.01) |
| H02J 1/10 | (2006.01) |
| B60R 16/03 | (2006.01) |
| H02J 7/00 | (2006.01) |

(52) U.S. Cl.
CPC .............. B60L 58/20 (2019.02); B60R 16/03 (2013.01); F16H 61/0204 (2013.01); H02J 1/10 (2013.01); H02J 7/0029 (2013.01)

(58) Field of Classification Search
CPC ........ B60L 3/0092; B60L 58/20; Y02T 10/70; F16H 61/0204; F16H 63/48; F16H 2061/1292; H02J 7/0029; H02J 1/10; B60R 16/03
See application file for complete search history.

(56) References Cited

U.S. PATENT DOCUMENTS

| | | | |
|---|---|---|---|
| 8,412,422 B2 | 4/2013 | Kamada et al. | |
| 2009/0273235 A1* | 11/2009 | Ichikawa | B60L 7/14 |
| | | | 307/9.1 |
| 2015/0134231 A1 | 5/2015 | Li et al. | |
| 2019/0036374 A1 | 1/2019 | Hida | |
| 2019/0071039 A1 | 3/2019 | Tsukamoto | |
| 2020/0086762 A1* | 3/2020 | Kirchhoffer | B60L 3/0023 |

FOREIGN PATENT DOCUMENTS

| | | | | |
|---|---|---|---|---|
| DE | 102006010713 A1 | 9/2007 | | |
| JP | 2018013136 A | 1/2018 | | |
| KR | 20150041729 A | * 4/2015 | | A61H 39/04 |

* cited by examiner

*Primary Examiner* — Jared Fureman
*Assistant Examiner* — Duc M Pham
(74) *Attorney, Agent, or Firm* — Frank Lollo; Eversheds Sutherland (US) LLP

(57) ABSTRACT

The invention relates to a method for operating an on-board electrical network (4) of a motor vehicle (2), having a first voltage circuit (I) and a second voltage circuit (II), the first voltage circuit (I) having a first operating voltage which is higher than a second operating voltage in the second voltage circuit (II), wherein the first voltage circuit (I) is connected to the second voltage circuit (II), the first voltage circuit (I) having a battery (10) and the second voltage circuit (II) having at least one main battery (12a) and a second main battery (12b), wherein the first main battery (12a) and the second main battery (12b) have essentially the same capacity, and wherein components of the motor vehicle (2) are supplied with electrical operating energy from the first main battery (12a) and/or the second main battery (12b) by means of a switch assembly (14).

17 Claims, 4 Drawing Sheets

METHOD FOR OPERATING AN ON-BOARD ELECTRICAL NETWORK OF A MOTOR VEHICLE

CROSS-REFERENCE TO RELATED APPLICATIONS

The disclosure claims priority to and the benefit of DE Patent Application No. 102019125067.6, filed Sep. 18, 2019, which is hereby incorporated by reference herein in its entirety.

FIELD

The invention relates to a method for operating an on-board electrical network of a motor vehicle. The invention also relates to a computer program product, an on-board electrical network for a motor vehicle, and a motor vehicle having such an on-board electrical network.

BACKGROUND

An on-board electrical network is understood to mean the totality of all electrical components in a motor vehicle, such as a car.

A 12-Volt on-board electrical network can now barely cover the power consumption required by a modern motor vehicle for its comfort systems. The "static" consumers almost completely exhaust the alternator, which delivers up to 3 kW of power, especially at low temperatures. For additional dynamic consumers, such as powerful electrically driven compressors, the battery power is not sufficient. Therefore, a second partial on-board electrical network with a voltage of 48 Volts is added, which complements the 12-Volt onboard network.

An on-board electrical network with an operating voltage of 48 Volts also offers the possibility of implementing a simpler hybridization quickly and cost-effectively and of keeping harmful emissions below statutory limits by partial electrification of the powertrain of the motor vehicle.

The use of a 48-Volt on-board electrical network does not replace the previously known 12V on-board network, but supplements it. Many established components in the motor vehicle can continue to be operated exclusively with a voltage of 12 Volts. Thus, a complete and therefore expensive conversion to higher electrical voltages can be avoided.

In operation a uni- or bidirectional DC/DC converter supplies the 12-Volt on-board network from the 48-Volt onboard network.

In the case of a motor vehicle in the form of a mild hybrid, the powertrain has an electric motor, such as a belt-driven starter generator (BiSG) or a transmission-integrated motor generator (TiMG), an inverter, a DC/DC converter and a 48-Volt battery.

Hence a 48-Volt on-board electrical network can be used to operate an electric motor as a motor with up to 15 kW. However, this requires an engine restart under all driving conditions, even at low speeds.

In view of the engine start requirement and the need to decouple the main battery, a second battery is required in combination with a 12 V output of the DC/DC converter in order to stabilize the on-board supply voltage in particular when starting up the internal combustion engine. However, given fluctuations in the operating temperature a 12-Volt output of the DC/DC converter cannot be regarded as stable.

Special requirements on operational safety are placed by Shift-by-Wire systems or Park-by-Wire systems, in which actuating signals are only transmitted electrically. Some system redundancy is therefore required in the on-board network voltage, so that for example a motor vehicle can be safely parked with a parking system or an electric parking brake in the event of a particular fault in the on-board electrical network.

The 48-Volt battery can be a lithium-ion battery. Such lithium-ion batteries, however, do not deliver sufficient electrical current at low temperatures to start the engine. Therefore, a conventional starter is supplied with operating power from a 12-Volt lead-acid battery.

In the patents US 2019/0036374 A1, DE 10 2006 010713 A1, U.S. Pat. No. 8,412,422 B2, US 2019/0071039 A1 and US 2015/0134231 A1, on-board networks are disclosed which have a 48-volt lithium battery and a 12-volt lead battery.

There is therefore a need to identify ways in which the operating safety of such an on-board electrical network can be increased.

SUMMARY

The object of the invention is achieved by a method for operating an on-board electrical network of a motor vehicle, having a first voltage circuit and a second voltage circuit, the first voltage circuit having a first operating voltage which is higher than a second operating voltage in the second voltage circuit, the first voltage circuit being connected to the second voltage circuit via a DC/DC converter, the first voltage circuit having a battery and the second voltage circuit having at least one main battery, wherein the first main battery and the second main battery have essentially the same capacity, and wherein by means of a switch assembly, components of the motor vehicle are supplied with electrical energy from the first main battery and/or the second main battery.

A capacity that is essentially the same means that the respective capacities of the first and second main batteries differ by manufacturing-related tolerances, for example, by 5% or 10%. In other words, the first and second main batteries can be identical in design. In addition, the first and second main batteries can be combined into one component and can be accommodated in a common housing, for example.

A first of the two main batteries is used to supply all components of the on-board network with electrical operating energy, while the second of the two main batteries is used also to supply all components of the on-board network with electrical operating energy and additionally to provide fault management (FMEM, also known as failure mode management) or system redundancy in the event of a failure of the first main battery.

The fact that the first main battery and the second main battery have essentially the same capacity prevents overheating of the main battery that has the lower capacity. Measures to prevent overheating of the main battery with the smaller capacity can thus be omitted. In addition, there is no need to provide controlled charging and discharging of the lower capacity if one battery is smaller. A significant advantage is that the capacity of the first and second main batteries is equal to the sum of the total capacity of a single main battery. The invention divides the total capacity of a single main battery into two functional halves as described above, respectively into a first and a second main battery. A smaller backup battery for a single low-capacity main battery is no longer required. This invention not only improves the robustness, but also decreases the installation space and reduces the additional costs of a smaller replacement battery.

According to an embodiment, the switch assembly has a 3-way changeover switch. A 3-way changeover switch is a switch in which an input is connected to one of three outputs, but a connection is always provided between the input and one of the three outputs. In other words, there is no open switching state that would disconnect the input from all outputs at the same time. This ensures that there is always a connection between the input and one of the outputs, and thus a supply of electrical operating energy is also guaranteed. In this way, a particularly reliable on-board network with a simple structure can be provided. The input is always connected to the entire on-board network at the same time as the first main battery.

According to a further embodiment, the switch assembly has a 2-way changeover switch and an isolating switch. The isolating switch differs from the 2-way and 3-way changeover switches in that it has an open switching state that disconnects the input from the output. This isolating switch performs the same function as the three functions of the 3-way changeover switch. This means that a particularly reliable on-board network can be provided with a simple, alternative design.

According to a further embodiment, in a fail-safe operating mode (State R) at least one of the components is a transmission control unit and/or an integrated hybrid controller and/or a gear-selection control unit. In the fail-safe operating mode, for example, the main battery of the two that supplies these components is thus designed to supply all components of the on-board network with electrical operating energy and to provide the fault management. This ensures that even in the event of a fault, the transmission control unit and/or the integrated hybrid controller and/or the gear-selection control unit, such as a shift-by-wire and park-by-wire control unit, are supplied with operating energy by the fault management system and therefore function correctly.

This output, when switched, separates the first main battery from the second, the first main battery supplying the ABS system with electrical voltage. This is done independently in comparison to the second main battery, which is connected to the park-by-wire/shift-by-wire. This ensures that the park/shift-by-wire and the ABS system have a separate, guaranteed, supply of electrical operating energy.

According to another embodiment, in a standby mode (State L), the first main battery and the second main battery together supply at least one of the components of the on-board network with electrical operating energy via a fuse. In standby mode, the total capacity of the two main batteries is therefore used. If the fuse opens, the first main battery is disconnected from the second main battery with a separate supply of electrical energy compared to the operating mode which can be selected externally.

According to a further embodiment, in a start-up mode (State M) the first main battery and the second main battery together supply at least one of the components of the on-board network with electrical operating energy, bypassing the fuse, and are disconnected from the rest of the on-board network. Bypassing the fuse by, for example by enabling an electrically conductive bypass, ensures that the fuse is not overloaded and thereby tripped when the internal combustion engine is started. This further increases the operational safety.

The invention also relates to a computer program product, an on-board electrical network for a motor vehicle, and a motor vehicle having such an on-board network.

BRIEF DESCRIPTION OF THE DRAWINGS

The invention will now be explained with reference to a drawing. In the drawings.

DETAILED DESCRIPTION

Figure 1:
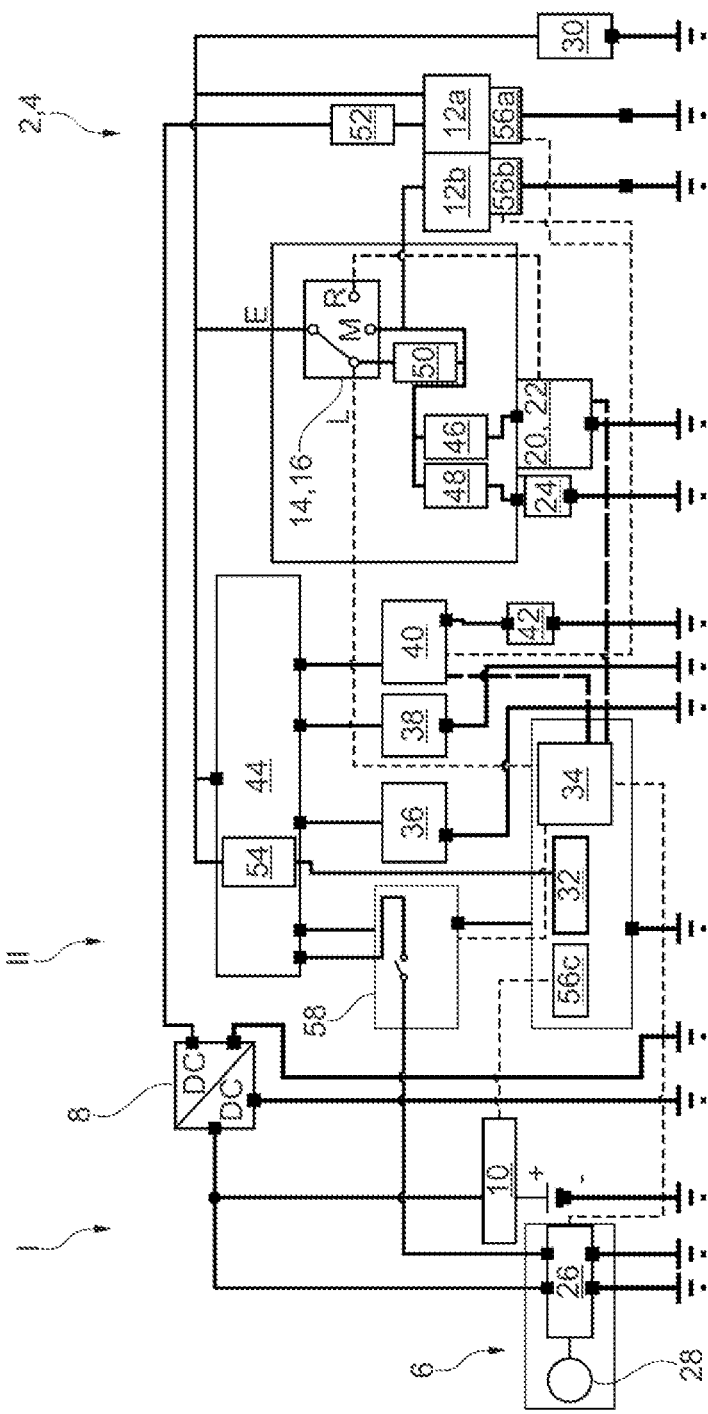
FIG. 1 shows a schematic representation of an on-board electrical network of a motor vehicle according to a first exemplary embodiment.

Reference will first be made to FIG. 1 to explain a first exemplary embodiment.

FIG. 1 shows an on-board electrical network 4 of a motor vehicle 2, such as a car.

The motor vehicle 2 in the present exemplary embodiment has a powertrain 6. This powertrain 6 comprises all the components of the motor vehicle 2 that generate the power to drive the motor vehicle 2 and transfer it onto the road.

In the present exemplary embodiment the powertrain 6 is designed as a mild hybrid powertrain. In other words, the motor vehicle 2 has a hybrid drive and is implemented as a hybrid electric vehicle. A hybrid drive is understood to mean a combination of an internal combustion engine (not shown) and an electric motor 28 for the motor vehicle drive.

The internal combustion engine in the present exemplary embodiment is a petrol engine. In normal operation the petrol engine is operated with an oxygen excess ($\lambda$>1). By way of deviation from this, the internal combustion engine can also be designed as a Diesel engine in lean-burn mode to increase the engine efficiency.

The electric motor 28 is an electrical rotary motor with a rotor and a stator, which can be operated both as a motor, i.e. as a partial traction motor, and as a generator for energy recuperation. The electric motor 28 can be designed, for example, as a DC motor, an AC motor, a synchronous motor, an asynchronous motor, a brushless electric motor or as a combination of these motor types.

The electric motor 28 of the powertrain 6 implemented as a mild hybrid powertrain delivers up to 15 kW per tonne of vehicle weight. In operation the electric motor 28 only assists the internal combustion engine to increase power. A purely electric driving is only possible to a limited extent, if at all.

The internal combustion engine and the electric motor 28 can work together in different ways: in parallel (the internal combustion engine and the electric motor 28 act on the moving part at the same time), serially (only one of the motors acts directly on the moving part, while the other motor provides power which is converted and fed to the directly acting motor), or as a power-split hybrid.

The powertrain 6 implemented as a mild hybrid powertrain in the present exemplary embodiment is implemented as a parallel hybrid powertrain.

The on-board electrical network 4 has a first voltage circuit I and a second voltage circuit II. In operation, the first voltage circuit operates at a first operating voltage which is higher than a second operating voltage in the second voltage circuit II. In the present exemplary embodiment, the first operating voltage is 48 volts and the second operating voltage is 12 volts.

The first voltage circuit I is connected to the second voltage circuit II via a DC/DC converter 8. The DC/DC converter 8 in the present exemplary embodiment is designed for bidirectional voltage conversion, so for both stepping up and stepping down an electrical voltage.

The first voltage circuit I in the present exemplary embodiment comprises a battery 10 and an inverter 26.

The battery 10 in this exemplary embodiment is a lithium-ion battery which is electrically conductively connected to the DC/DC converter 8.

The inverter 26 is a bi-directional inverter. In the generator mode of the electric motor 28 the inverter 26 converts an electrical AC voltage into an electrical DC voltage, and vice versa in the case of an application as an electric motor, converting an electrical DC voltage into an electrical alternating voltage. For this purpose the inverter 26 is electrically conductively connected on the input side to the electric motor 28. The inverter 26 is additionally electrically conductively connected on the output side to the DC/DC converter 8.

The second voltage circuit II in the present exemplary embodiment comprises as an essential component a first main battery 12a and a second main battery 12b of essentially the same capacity, a switch assembly 14 with a 3-way changeover switch 16 in the present exemplary embodiment, a transmission control unit (TCM) 20, an integrated hybrid controller (HFM) 22, e.g. integrated in a transmission control unit, and a gear-selection control unit (GSM) 24 for gear selection between Drive/Neutral/Reverse and Park, which allows the electrically actuated parking lock/immobilizer to be engaged in the transmission and thereby secure the vehicle, and a starter 30. The starter 30 in this exemplary embodiment is a conventional 12V starter.

The gear-selection control unit 24 is actuated by the driver who thus expresses a desire to engage Drive/Neutral/Reverse or Park. The gear-selection control unit 24 then sends an equivalent signal to the transmission control unit 20, which executes this command.

Other components are an ABS/EPB system 32, a powertrain control unit (PCM) 34, an EPAS system 36, a gateway module (GWM) 38, an on-board network control unit (BCM) 40, an infotainment system (IPC) 42, a fuse assembly 44, a first fuse 46, a second fuse 48, a third fuse 50, a fourth fuse 52, an EPB/ABS fuse 54, a first battery management system 56a assigned to the first main battery 12a and a second battery management system 56b assigned to the second main battery 12b, as well as a third battery management system 56c assigned to the battery 10.

The components listed may have hardware and/or software components for their tasks and functions described below.

In this exemplary embodiment, the 3-way changeover switch 16 has an input-side connection E and three output-side connections L, M, R.

During operation, the 3-way changeover switch 16 can be activated in such a way that the 3-way changeover switch 16 electrically connects the input-side connection E to the output-side connection L or the output-side connection M or the output-side connection R.

If the 3-way changeover switch 16 connects the input-side connection E to the output-side connection R in an electrically conducting manner, the on-board network 4 is in a fail-safe operating mode (State R). In this exemplary embodiment, the transmission control unit 20 and/or an integrated hybrid controller 22 are now supplied with electrical operating energy from the second main battery 12b only and the first main battery 12a is disconnected from the on-board network 4. This means that the ABS/EPB system 32 is connected to the first main battery 12a and the transmission control unit (TCM) 20, an integrated hybrid controller (HFM) 22, e.g. integrated in a transmission control unit, and a gear selection control unit (GSM) 24 for gear selection between Drive/Neutral/Reverse and Park are connected independently of each other to the second main battery 12b, thus providing a system redundancy for vehicle safety when stationary.

On the other hand, if the 3-way changeover switch 16 connects the input-side connection E to the output-side connection L in an electrically conducting manner, the on-board network 4 is in a standby mode (State L). In this exemplary embodiment, the transmission control unit 20 and/or an integrated hybrid controller 22 as well as the gear-selection control unit 24 are now supplied with electrical operating energy from the first main battery 12a and the second main battery 12b via the fuse 50 and via the fuse 46 or fuse 48 respectively. In addition, further components of the on-board network 4 can be supplied with electrical operating energy from the first main battery 12a and the second main battery 12b.

However, if the 3-way changeover switch 16 connects the input-side connection E to the output-side connection M in an electrically conducting manner, the on-board network 4 is in a starting mode (State M). An electrically conductive bypass is now formed, which allows the fuse 50 to be bypassed. Thus in this exemplary embodiment, while the internal combustion engine is starting, the transmission control unit 20 and/or an integrated hybrid controller 22 and the gear-selection control unit 24 can be supplied with electrical operating energy from the first main battery 12a and the second main battery 12b together in a parallel connection, bypassing the fuse 50, and simultaneously disconnected from the rest of the on-board network 4.

In the present exemplary embodiment, when a fault is detected in the first main battery 12a, upon being activated by the on-board network control unit 40 by providing appropriate activation signals, the transmission control unit 20 and/or an integrated hybrid controller 22 causes the 3-way changeover switch 16 to connect the input-side connection E to the output-side connection R in an electrically conducting manner, so that the on-board network 4 is in the fail-safe operating mode (State R).

In addition, in the present exemplary embodiment, the powertrain control unit 34, by providing appropriate control signals, causes the 3-way changeover switch 16 to connect the input-side connection E to the output-side connection L in an electrically conducting manner, so that the on-board network 4 is in a standby mode (State L), and the 3-way changeover switch 16 to connect the input-side connection E to the output-side connection M in an electrically conducting manner, so that the on-board network 4 is in the starting mode (State M).

The control signals can be transmitted, for example, via a CAN bus of the motor vehicle 2.

Figure 2:
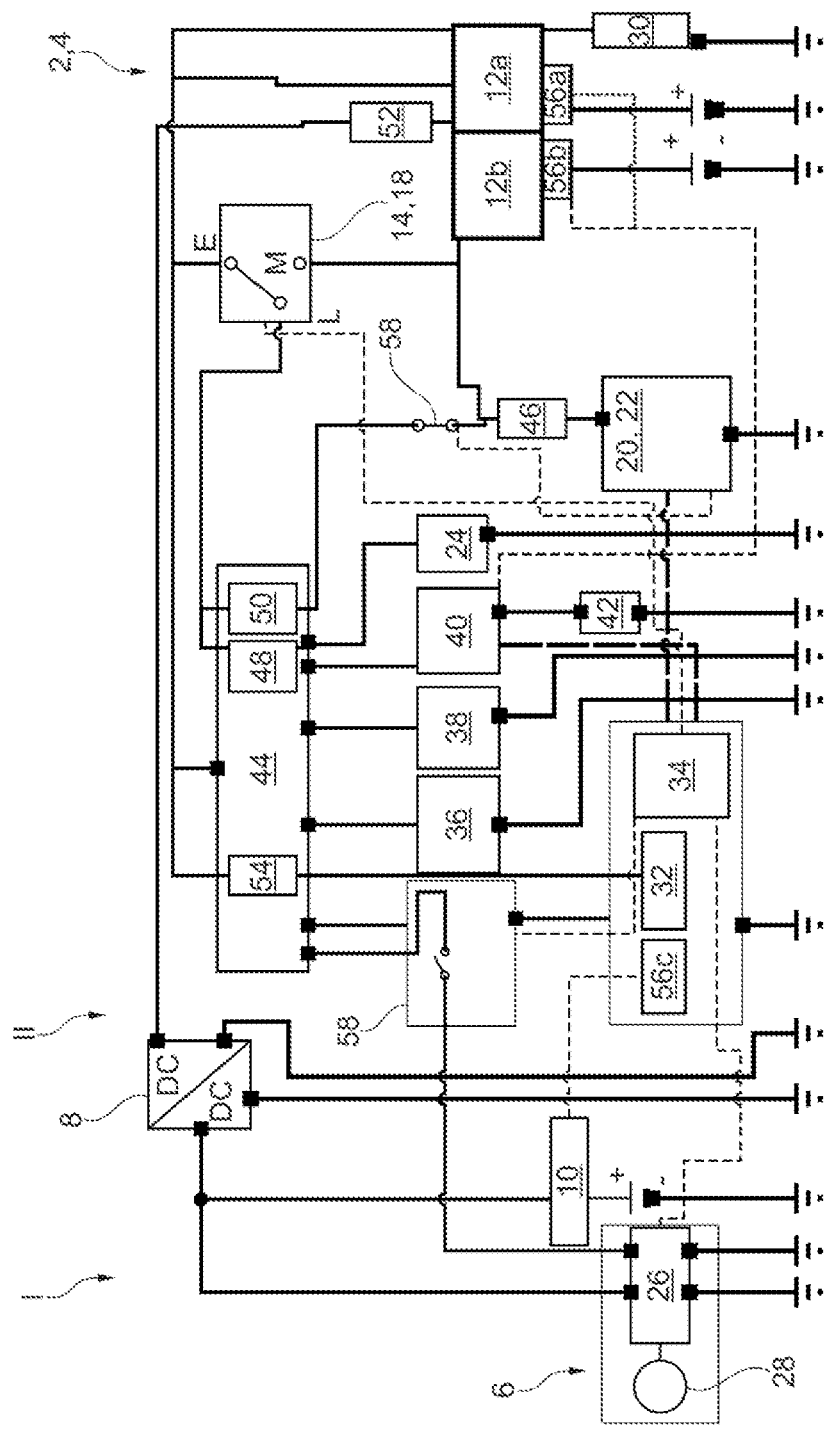
FIG. 2 shows a schematic representation of an on-board electrical network of a motor vehicle according to a second exemplary embodiment.

Reference will now additionally be made to FIG. 2 to explain a second exemplary embodiment.

The on-board network 4 according to the second exemplary embodiment differs from the on-board network 4 according to the first exemplary embodiment in that instead of the 3-way changeover switch 16, the switch assembly 14 has a 2-way changeover switch 18 and an isolating switch 58, and that the fuse 48 and the fuse 50 are now assigned to the fuse assembly 44. Here, the isolating switch 58, activated by the transmission control unit 20, disconnects the second main battery 12b connected to the fuse 46 and the transmission control unit 20, and/or an integrated hybrid controller 22, from the rest of the on-board network 4. In the event of overload, the fuse 50 opens.

The 2-way changeover switch 18 can be activated in such a way that the 2-way changeover switch 18 electrically connects the input-side connection E to the output-side connection L or the output-side connection M.

The function of the output-side connection R, or switching to the fail-safe operating mode (State R), is effected by opening the isolating switch 58. A system redundancy then exists between the transmission control unit 20 connected to the second main battery 12*b*, and the ABS/EPB system 32 connected to the first main battery 12*a*.

Otherwise, the comments made above with regard to the structure and function of the on-board network 4 also apply analogously to the on-board network 4 according to the second exemplary embodiment.

Figure 3:
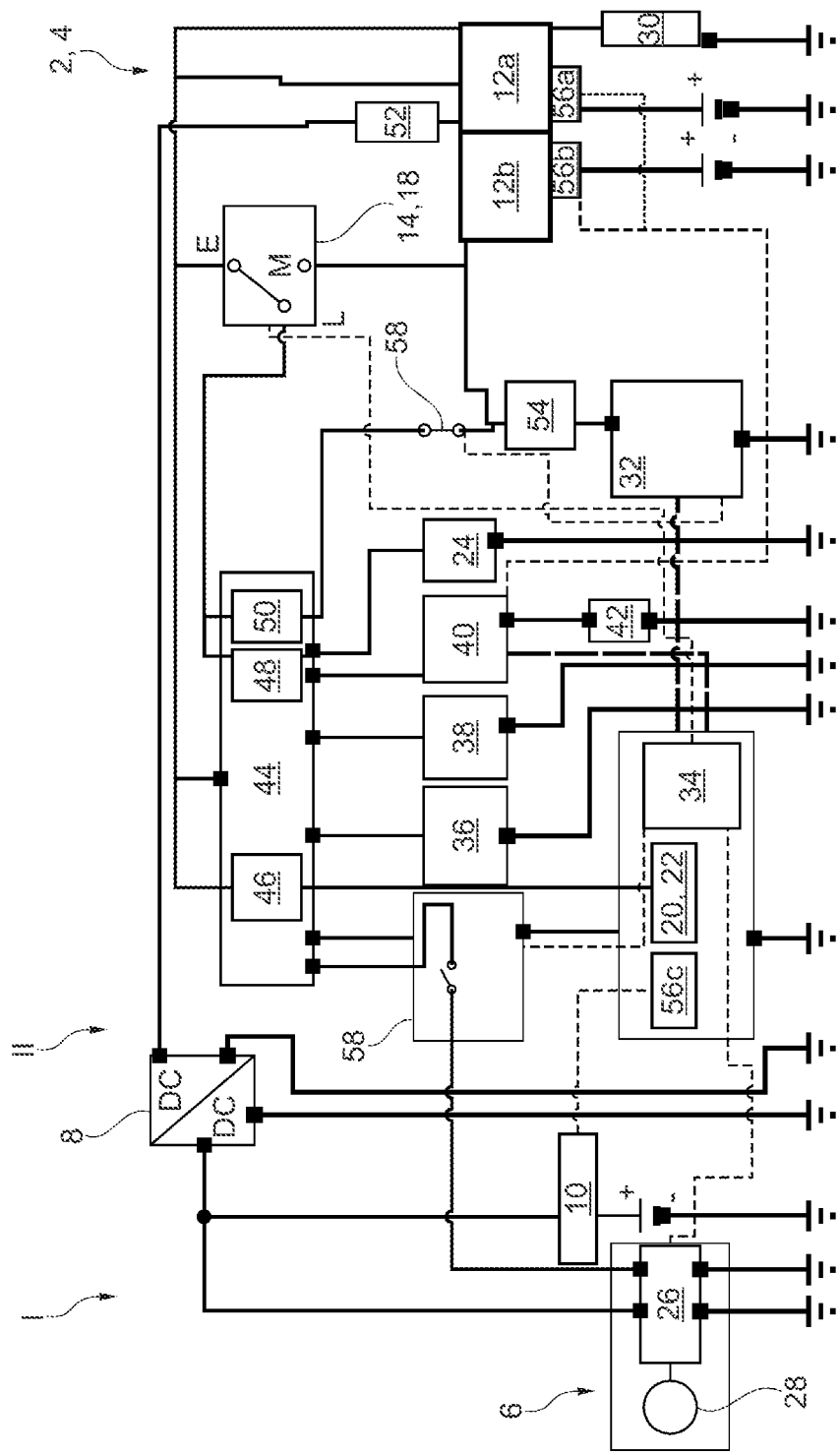
FIG. 3 shows a schematic representation of an on-board electrical network of a motor vehicle according to a third exemplary embodiment.

Reference will now additionally be made to FIG. 3 to explain a third exemplary embodiment.

The on-board network 4 according to the third exemplary embodiment differs from the on-board network 4 according to the second exemplary embodiment in that the transmission control unit 20 and/or an integrated hybrid controller 22 as well as the ABS/EPB system 32 and their corresponding fuses 54 and fuse 46 have now swapped positions in the on-board network 4. The same system redundancy is achieved here as in the second exemplary embodiment. In this case, the isolation switch 58 is controlled by the ABS/EPB system. In the event of overload, the fuse 50 opens.

Otherwise, the comments made above with regard to the structure and function of the on-board network 4 also apply analogously to the on-board network 4 according to the third exemplary embodiment.

Figure 4:
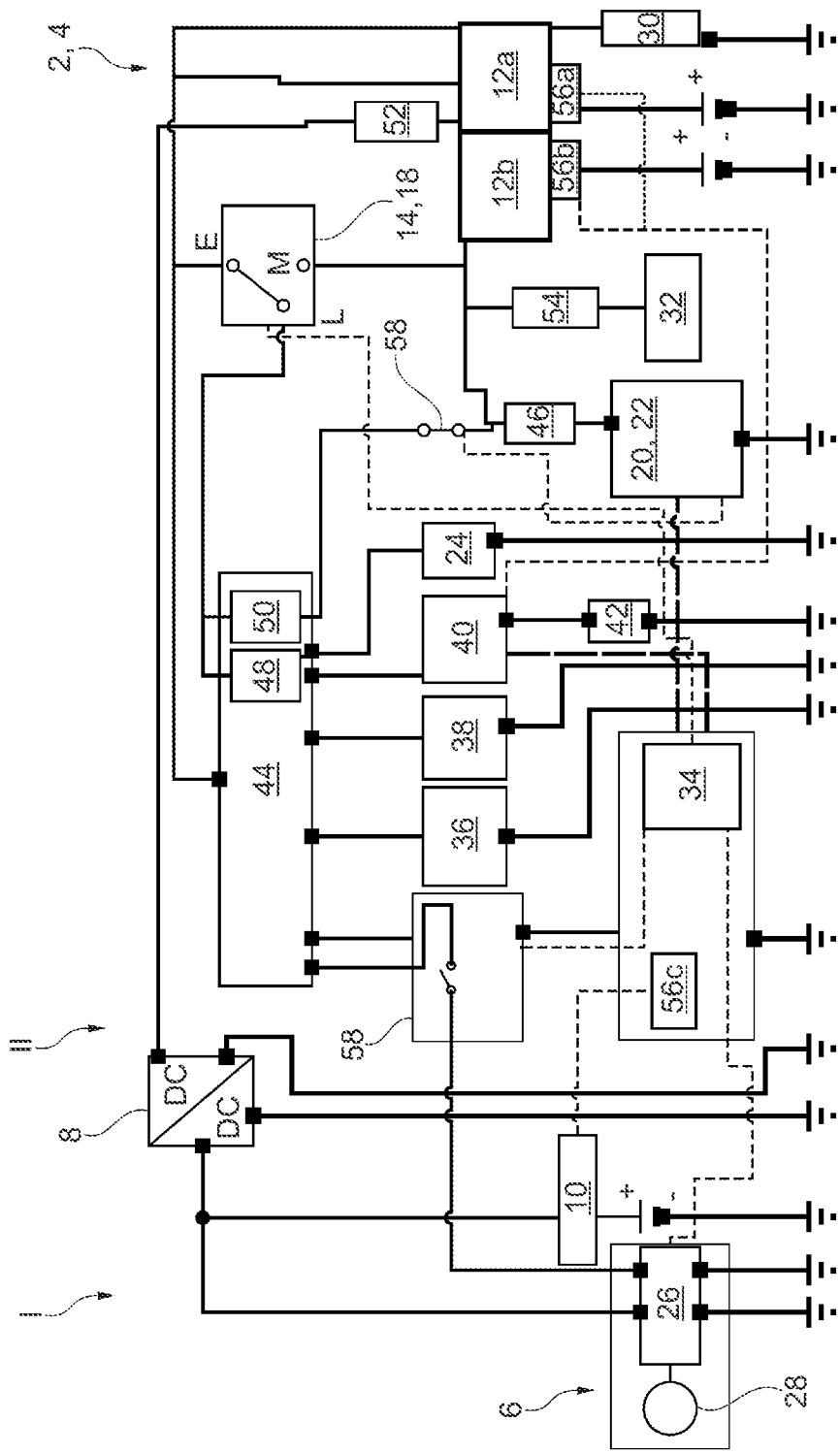
FIG. 4 shows a schematic representation of an on-board electrical network of a motor vehicle according to a fourth exemplary embodiment.

Reference will now additionally be made to FIG. 4 to explain a fourth exemplary embodiment.

The on-board network 4 according to the fourth exemplary embodiment differs from the on-board network 4 according to the third exemplary embodiment in that the transmission control unit 20 and/or an integrated hybrid controller 22 as well as the ABS/EPB system 32 and its corresponding fuses 54 and fuse 46 are now electrically connected to the second main battery 12*b* and can be disconnected from the rest of the on-board network 4 via the isolating switch 58. In the event of overload, the fuse 50 opens. This exemplary embodiment implements a redundancy of the operating energy from either the first main battery 12*a* or the second main battery 12*b* for the ABS/EPB system 32 and for the transmission control unit 20. The isolation switch 58 can be activated by both components.

Otherwise, the comments made above with regard to the structure and function of the on-board network 4 also apply analogously to the on-board network 4 according to the fourth exemplary embodiment.

In summary, the second, third and fourth exemplary embodiment each have the same function, but differ in terms of the positions of the ABS/EPB system 34, the transmission control unit 20 and the gear-selection control unit 24 with their corresponding fuse systems.

A method for operating the on-board electrical network 4 will now be explained.

To operate the on-board electrical network 4 of the motor vehicle 2 with the first voltage circuit I and the second voltage circuit II, by means of the switch assembly 14 components of the motor vehicle 2 are supplied with electrical operating energy from the first main battery 12*a* and/or the second main battery 12*b*.

The on-board network 4 is then in the standby mode (State L) or in the starting mode (State M). For this purpose, in the present exemplary embodiment, by providing appropriate control signals the powertrain control unit 34 has caused the input-side connection E to be electrically connected to the output-side connection L or to the output-side connection M.

In the standby mode (State L), the first main battery 12*a* and the second main battery 12*b* together supply the transmission control unit 20 and/or an integrated hybrid controller 22 via the fuse 50 and the fuse 46, and supply the gear-selection control unit 24 via the fuse 50 and the fuse 48.

In the starting mode (State M) on the other hand, the first main battery 12*a* and the second main battery 12*b* together supply the transmission control unit 20 and an integrated hybrid controller 22 as well as the gear-selection control unit 24 with electrical operating energy from the first main battery 12*a* and the second main battery 12*b* together in a parallel connection, bypassing the fuse 50, while the engine is starting.

Upon detecting a fault in a first step, e.g. by the on-board network control unit 40, in a further step, for example, the transmission control unit 20 and/or an integrated hybrid controller 22 provides appropriate activation signals which cause a changeover into the fail-safe operating mode (State R), in which, for example, the transmission control unit 20 and an integrated hybrid controller 22 and a gear-selection control unit 24 are only supplied with electrical operating energy from the second main battery 12*b* and the first main battery 12*a* is disconnected from the on-board network 4.

If the fuse 50 fails, the transmission control unit 20 and/or a hybrid controller 22 integrated in a transmission control unit are supplied with electrical operating energy from the second main battery 12*b* via the respective fuse 46 or fuse 48. All other components of the on-board network 4, which are electrically connected exclusively to the first main battery 12*a*, then no longer receive any electrical operating energy from the second main battery 12*b*.

If the first main battery 12*a* does not provide any electrical operating energy and the 3-way changeover switch 16 electrically connects the input-side connection E to the output-side connection L (standby mode or State L), the second main battery 12*b* supplies all components with electrical operating energy.

The ABS/EPB system 32 is also supplied with electrical operating energy by the second main battery 12*b*.

In the event of a major battery failure, a changeover into the fail-safe operating mode (State R) can be made. The defective first main battery 12*a* is disconnected from the second main battery 12*b*.

In the event of a power loss due to a short circuit, the on-board network is in the standby mode (State L). If the fuse 50 has also failed, the second main battery 12*b* supplies the transmission control unit 20 and/or a hybrid controller 22 integrated in a transmission control unit, in addition to the gear-selection control unit 24. However, the ABS/EPB system 32 is not now supplied with electrical operating energy.

The transmission control unit 20 and/or a hybrid controller 22 integrated in a transmission control unit can cause a changeover into the fail-safe operating mode (State R) in order to disconnect the second 12*b* main battery from the first main battery 12*a*.

However, if the second main battery 12*b* provides too little power, the system can be changed over to the standby mode (State L) or to the starting mode (State M). Then both the transmission control unit 20 and/or an integrated hybrid controller 22 as well as the gear-selection control unit 24 and the ABS/EPB system 32 are supplied with electrical operating energy from both main batteries 12a, 12b.

If it is not possible to switch over to the fail-safe operating mode (State R), the transmission control unit 20 and/or an integrated hybrid controller 22 and the gear-selection control unit 24 are still supplied with electrical operating energy from the second main battery 12b and the ABS/EPB system 32 is supplied from the first main battery 12a.

If it is not possible to switch over to the starting mode (State M) and/or to the standby mode (State L), the transmission control unit 20 and/or an integrated hybrid controller 22 as well as the gear-selection control unit 24 and the ABS/EPB system 32 are still supplied with electrical operating energy from the first main battery 12a and from the second main battery 12b.

If both the first main battery 12a and the second main battery 12b fail, this is detected by the on-board network control unit 40, for example.

Then, for example, the transmission control unit 20 and/or an integrated hybrid controller 22 is/are supplied with electrical operating energy from the 12-Volt side of the DC/DC converter 8.

If it is not possible to provide such an electrical energy supply, an electric parking brake of the vehicle is activated by the on-board network control unit 40:
the operational safety of such an on-board network 4 can thus be increased.

The invention claimed is:

1. A method for operating an on-board electrical network (4) of a motor vehicle (2), the method comprising:
wherein the on-board electrical network (4) comprises a first voltage circuit (I) and a second voltage circuit (II), the first voltage circuit (I) having a first operating voltage which is higher than a second operating voltage in the second voltage circuit (II), wherein the first voltage circuit (I) is connected to the second voltage circuit (II) via a DC/DC converter (8), wherein the first voltage circuit (I) includes a battery (10) and the second voltage circuit (II) includes a first main battery (12a) and a second main battery (12b), and wherein the first main battery (12a) and the second main battery (12b) have substantially the same capacity, and
energy from the first main battery (12a) and/or the second main battery (12b) by
activating a switch assembly (14) to place the on-board electrical network (4) in a selected one of a standby mode (State L), a start-up mode (State M), or a fail-safe operating mode (State R), wherein in each of the standby mode (State L) and the start-up mode (State M), at least one component of the on-board electrical network (4) is provided electrical operating energy from the first main battery (12a) and the second main battery (12b), and wherein in the fail-safe operating mode (State R) the first main battery (12a) is disconnected and the at least one component of the on-board electrical network (4) is provided electrical operating energy from the second main battery (12b).

2. The method according to claim 1, wherein the switch assembly (14) has a 3-way changeover switch (16).

3. The method according to claim 1, wherein the switch assembly (14) has a 2-way changeover switch (18) and an isolating switch (58).

4. The method according to claim 1, wherein the at least one component is one of a transmission control unit (20), an integrated hybrid controller (22), and/or or a gear-selection control unit (24).

5. The method according to claim 1, wherein in the standby mode (State L), the first main battery (12a) and the second main battery (12b) together supply the at least one component with electrical operating energy via a fuse (50).

6. The method according to claim 5, wherein in the start-up mode (State M), the first main battery (12a) and the second main battery (12b) together supply the at least one component with electrical operating energy, bypassing the fuse (50), and are disconnected from the rest of the on-board electrical network (4).

7. A computer program product designed to execute the method according to claim 1.

8. An on-board electrical network (4) for a motor vehicle (2), the on-board electrical network (4) comprising:
a first voltage circuit (I); and
a second voltage circuit (II),
wherein the first voltage circuit (I) includes a first operating voltage which is higher than a second operating voltage in the second voltage circuit (II),
wherein the first voltage circuit (I) is connected to the second voltage circuit (II) via a DC/DC converter (8),
wherein the first voltage circuit (I) includes a battery (10) and the second voltage circuit (II) includes a first main battery (12a) and a second main battery (12b), and
wherein the first main battery (12a) and the second main battery (12b) have substantially the same capacity.

9. A motor vehicle (2) having an on-board electrical network (4) according to claim 8.

10. The on-board electrical network (4) according to claim 8, further comprising:
a switch assembly (14) that is operable to place the on-board electrical network (4) in a selected one of a standby mode (State L), a start-up mode (State M), or a fail-safe operating mode (State R), wherein in each of the standby mode (State L) and the start-up mode (State M), at least one of the components of the on-board electrical network (4) is provided electrical operating energy from the first main battery (12a) and the second main battery (12b), and wherein in the fail-safe operating mode (State R) the first main battery (12a) is disconnected and the at least one of the components of the on-board electrical network (4) is provided electrical operating energy from the second main battery (12b).

11. The on-board electrical network (4) according to claim 10, wherein the switch assembly (14) has a 3-way changeover switch (16).

12. The on-board electrical network (4) according to claim 10, wherein the switch assembly (14) has a 2-way changeover switch (18) and an isolating switch (58).

13. The on-board electrical network (4) according to claim 10, wherein the at least one of the components is one of a transmission control unit (20), an integrated hybrid controller (22), and/or or a gear-selection control unit (24).

14. The on-board electrical network (4) according to claim 10, wherein in the standby mode (State L), the first main battery (12a) and the second main battery (12b) together supply the at least one of the components with electrical operating energy via a fuse (50).

15. The on-board electrical network (4) according to claim 14, wherein in the start-up mode (State M), the first main battery (12a) and the second main battery (12b) together supply the at least one of the components electrical operating energy, bypassing the fuse (50), and are disconnected from the rest of the on-board network (4).

16. A vehicle, comprising:
an on-board electrical network (4) comprising a first voltage circuit (I), and
a second voltage circuit (II),
wherein the first voltage circuit (I) includes a first operating voltage which is higher than a second operating voltage in the second voltage circuit (II),
wherein the first voltage circuit (I) is connected to the second voltage circuit (II) via a DC/DC converter (8),
wherein the first voltage circuit (I) includes a battery (10) and the second voltage circuit (II) includes a first main battery (12*a*) and a second main battery (12b),
wherein the first main battery (12*a*) and the second main battery (12b) have substantially the same capacity.
energy from the first main battery (12a) and/or the second main battery (12b).

17. The vehicle according to claim 16, further comprising:
a switch assembly (14) that is operable to place the on-board electrical network (4) in a selected one of a standby mode (State L), a start-up mode (State M), or a fail-safe operating mode (State R), wherein in each of the standby mode (State L) and the start-up mode (State M), at least one of the components of the on-board electrical network (4) is provided electrical operating energy from the first main battery (12*a*) and the second main battery (12*b*), and wherein in the fail-safe operating mode (State R) the first main battery (12*a*) is disconnected and the at least one of the components of the on-board electrical network (4) is provided electrical operating energy from the second main battery (12*b*).

* * * * *